A. MAHAM.
MEAT CUTTING MACHINE.
APPLICATION FILED MAY 15, 1912.
1,052,933.
Patented Feb. 11, 1913.
2 SHEETS—SHEET 2.
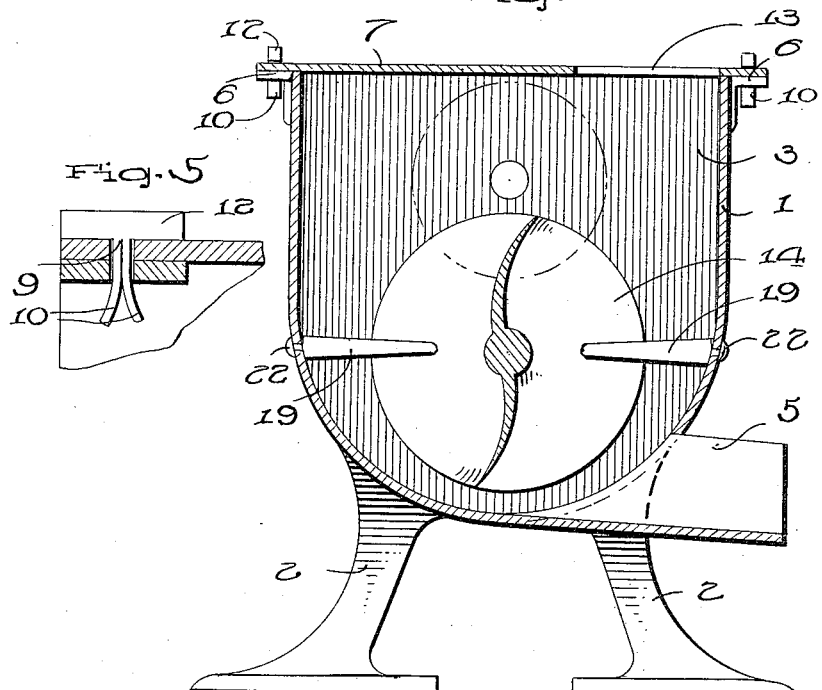
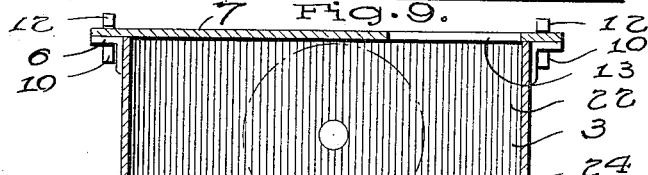
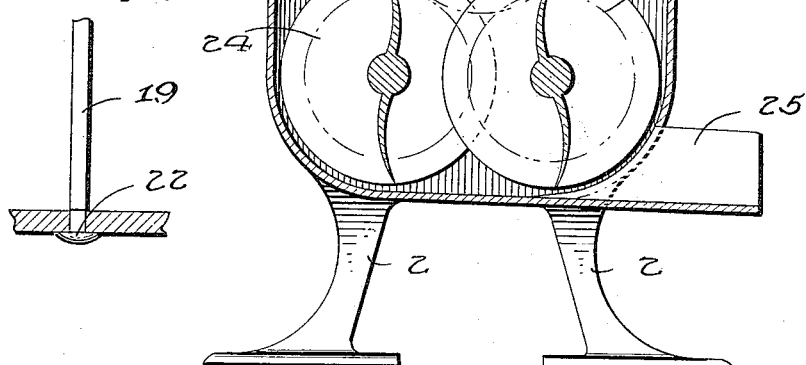
WITNESSES
INVENTOR
Anna Maham
By E. E. Trooman, her Attorney.

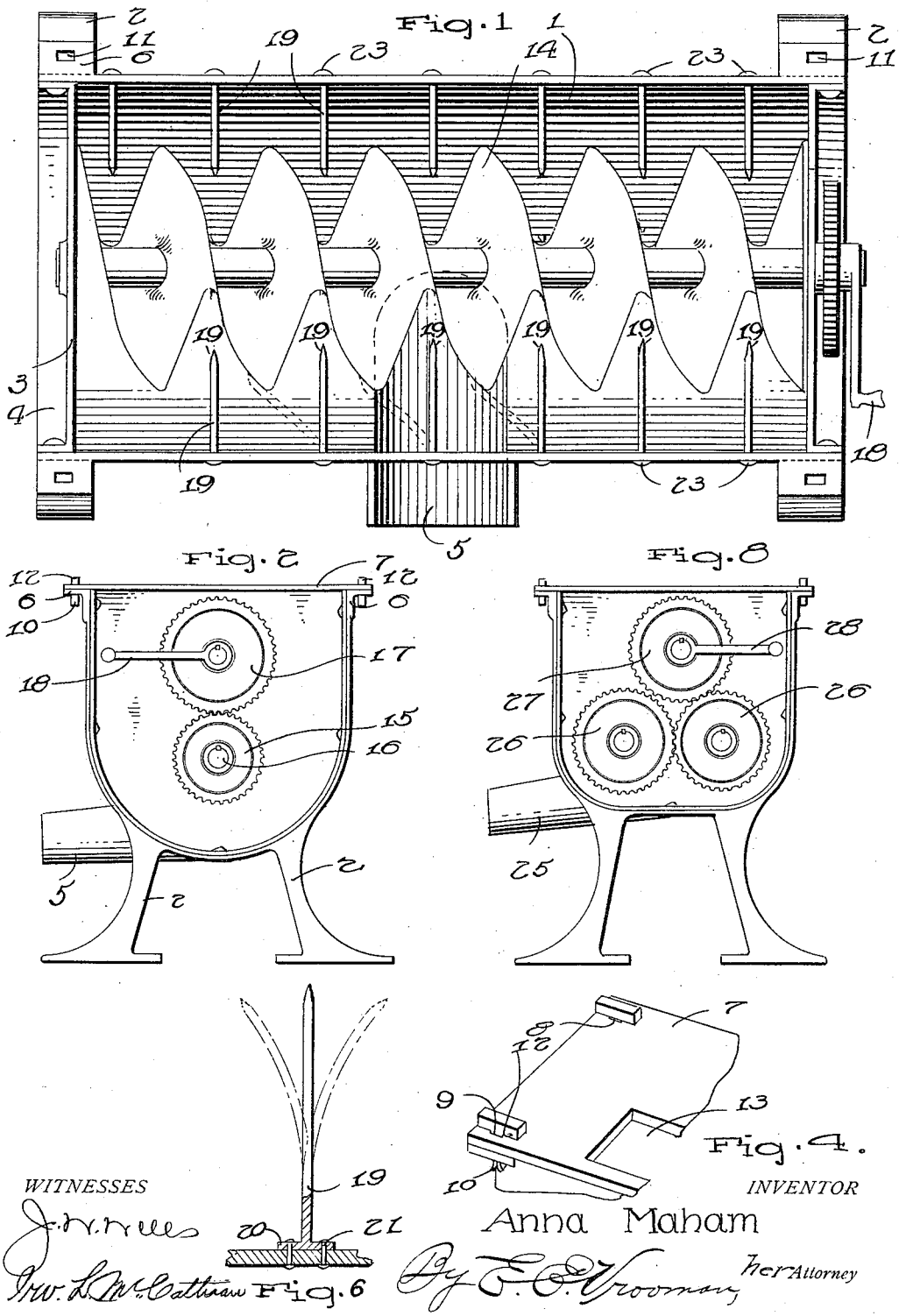

UNITED STATES PATENT OFFICE.

ANNA MAHAM, OF HAMILTON, OHIO.

MEAT-CUTTING MACHINE.

1,052,933.  Specification of Letters Patent.  Patented Feb. 11, 1913.

Application filed May 15, 1912. Serial No. 697,527.

*To all whom it may concern:*

Be it known that I, ANNA MAHAM, a citizen of the United States, residing at Hamilton, in the county of Butler and State of Ohio, have invented certain new and useful Improvements in Meat-Cutting Machines, of which the following is a specification, reference being had therein to the accompanying drawing.

This invention relates to meat cutters, and has for its object the production of an efficient device for cutting up meat or fat so as to allow the lard formed therefrom to be discharged in an efficient manner from the cutting hopper.

Another object of this invention is the production of an efficient cleaning means for engaging the spiral cutter whereby the fragments of the meat or fat will be freed from the edges of the spiral cutter.

With these and other objects in view, this invention consists of certain novel constructions, combinations, and arrangements of parts, as will be hereinafter fully described and claimed.

In the drawings:—Figure 1 is a top plan view of the invention showing the cover removed therefrom. Fig. 2 is an end view of the device set forth in Fig. 1. Fig. 3 is a central transverse section through the hopper disclosed in Figs. 1 and 2. Fig. 4 is a detail perspective showing the means for connecting the cover to the hopper. Fig. 5 is an enlarged sectional view disclosing the means for holding the top upon the hopper. Fig. 6 is a top plan view partly in section of the cleaning finger carried by the hopper. Fig. 7 is a detail modified form of the invention showing means for connecting the cleaning knife to the side of the hopper. Fig. 8 is an end view of the modified form of the device disclosed in Fig. 1. Fig. 9 is a central transverse section of the structure disclosed in Fig. 8 wherein two spiral cutters are carried by the hopper.

By referring to the drawings it will be seen that in the preferred embodiment, the lard making machine or meat cutter comprises the body or hopper 1 which has its ends supported upon supporting legs 2. These legs may be formed integral with or otherwise attached with the hopper. The ends of the hopper are closed by means of end plates 3 which have their rim portions 4 fitting snugly against the inner face of the hopper to hold the plates 3 in their correct position upon the hopper. The body is also provided with an integral laterally extending discharge spout 5, which is preferably positioned intermediate the ends of the hopper for discharging the lard from the hopper into a receptacle adapted to be placed under the discharge spout.

The hopper 1 is provided near its upper edge near each end with laterally extending ears 6 upon which ears rests the cover 7. The cover 7 is provided with apertures 8 through which the locking pins 9 pass and said locking pins 9 having their split ends 10 passing through the apertures 11 formed in the ears 6. The locking pins 9 are provided with T-shaped heads 12 for holding the cover 7 firmly in engagement with the hopper. The cover 7 is provided near one side with a longitudinally extending entrance opening 13 for facilitating the placing of the meat or fat into the hopper 1.

A spiral cutting knife 14 is carried centrally of the hopper and extends longitudinally thereof, and this spiral knife is adapted to rotate closely to the lower face of the hopper so as to cut the meat or fat placed therein up into small particles. A drive gear 15 is carried by the outer end of the shaft 16 which supports the spiral cutting knife 14, and this cutter 15 is driven by means of a gear 17. A crank 18 coöperates with the gear 17 for facilitating the rotation of the gear 17 upon the body of the hopper.

Cleaning knives 19 are securely fastened to the sides of the hopper and extend therethrough and project inwardly upon the spiral cutting knife so that as the spiral cutting knife is rotated the knives will whip around the edges of the spiral cutter so as to keep the cutting edges clean from any fragments of meat or other substance which might accumulate thereon. Furthermore, it will be seen that the meat or substance will be kept from becoming clogged, owing to the cleaning feature of these knives. These knives are formed of elastic or springy material and are preferably provided with T-shaped heads 20, which heads are secured to the sides of the hopper by means of rivets 21. As illustrated in Fig. 7 the knives 19 may be secured to the sides of the hopper by means of riveted heads 22.

As indicated in Fig. 9, the hopper 3 may be provided with a pair of spiral cutting knives 24 which interlock so as to form an efficient grinding means for the meat or fat to be placed within the hopper. A discharge spout 25, like the structure disclosed in Figs. 1 to 3 inclusive is also provided near the bottom of the hopper for discharging the lard into a receptacle. Gears 26 are carried by the respective spiral cutting knives and a driving gear 27 meshes with one of the gears 26 for imparting rotary movement to the cutting knives. A crank 28 is employed for operating the drive gear 27.

From the foregoing description it will be seen that a very efficient and durable device has been produced whereby the cutting knives will be readily freed from any substance which may collect upon the edges of the spiral knife.

What is claimed is:—

1. In a device of the class described comprising a hopper, a discharge spout, and a spiral cutting knife, a resilient cleaning knife projecting inwardly of said hopper and engaging said spiral cutting knife for whipping around the edges thereof for cleaning the same from any foreign substance which may collect upon the edges of the cutting knife.

2. A device of the class described comprising a hopper, a spiral cutting knife, a discharge spout, operating means for said spiral cutting knife, inwardly extending spring arms engaging said spiral cutting knife and adapted to whip around the edges thereof for cleaning the cutting blades of the spiral cutting knife from any foreign substance which may collect thereon, said cleaning knives positioned upon each side of said spiral cutting knife, and capable of lateral swinging movement.

In testimony whereof I hereunto affix my signature in presence of two witnesses.

ANNA MAHAM.

Witnesses:
  JOHN BRANNON,
  C. S. HAINES.

---

Copies of this patent may be obtained for five cents each, by addressing the "Commissioner of Patents, Washington, D. C."